Patented Mar. 2, 1943

2,312,484

UNITED STATES PATENT OFFICE 2,312,484

METHOD OF PREPARING CYCLOPENTANO-POLYHYDROPHENANTHRENE KETOLS AND ESTERS THEREOF

Tadeus Reichstein, Basel, Switzerland, assignor to the firm of Roche-Organon Incorporated, Nutley, N. J.

No Drawing. Application May 16, 1941, Serial No. 393,833. In Switzerland August 16, 1940

4 Claims. (Cl. 260—397.4)

This invention relates generally to compositions of matter valuable in therapy and processes of preparing the same, particularly derivatives of the cyclopenantanopolyhydrophenanthrene series.

It has been observed that cyclopentanopolyhydrophenanthrene ketols can be prepared by treatment of cyclopentanopolyhydrophenanthrene compounds having a substituent of the form —CHR—CHO wherein R is a free or an esterified hydroxyl group with enolising agents. These agents are capable of converting the hydroxy-aldehyde grouping to the grouping —CO—CH$_2$OH, thus yielding the corresponding ketol derivative. It has also been observed that esters of these compounds can be obtained in conventional manner by reacting the same with suitable esterifying agents.

In the preparation of these compounds, cyclopentanopolyhydrophenanthrene derivatives irrespective of substituents can be used as raw materials, but among the compounds found best suited for the purpose are those having beside the above substituent in the 17-position a hydroxyl group, or an ester or ether type group, and in the 3-position a ketogroup, a hydroxyl group, an ester or ether group, or derivatives thereof such as enol-derivatives. The materials may be saturated or unsaturated, in the nucleus or substituents thereof, and may be one or a mixture of several of the possible stereoisomers. They may also comprise derivatives of the above-mentioned substances capable of yielding compounds with the desired substituent

—CHOH—CHO during the course of the reaction, such as compounds having an ester group in the 20-position or also aldehyde derivatives. The following specific substances are typical of the materials which can be used in the practice of the present invention:

$\Delta^4$-Pregnene-17,20-diol-3-one-21-al
$\Delta^4$-Pregnene-11,17,20-triol-3-one-21-al
$\Delta^4$-Pregnene-20-ol-3-one-21-al
Pregnane-3,17,20-triol-21-al
$\Delta^5$-Pregnene-3,17,20-triol-21-al These substances can be prepared if desired, in the manner disclosed in copending application, Serial Number 393,831, filed May 16, 1941, by the same inventor.

Among the agents which have been found suitable for converting the $\alpha$-hydroxy aldehydes into corresponding $\alpha$-hydroxy ketones are basic organic compounds such as tertiary amines (pyridine and similar substances), alkali carbonates, certain acidic materials and, in some instances, water alone. The reaction preferably is performed in the presence of suitable solvents or diluents and after it has proceeded to the desired degree, the ketol derivative may be converted to an ester by treatment in accordance with usual esterification procedure. The products so obtained, both the ketols and their ester derivatives, are highly active adrenal cortical hormone preparations useful for therapeutic purposes.

To illustrate more specifically the novel process according to the present invention for preparing these therapeutically active compounds, the procedure followed in a typical instance will be hereinafter described but it is clearly to be understood that this data is supplied solely by way of example, not by way of limitation of this invention nor the subjoined claims.

Example

Approximately 33 parts by weight of $\Delta^4$-pregnene - 17,20 - diol - 3 - one - 21 - al - 20 - acetate which can be prepared as described in copending application, Serial Number 393,831, above mentioned, are dissolved in about 3000 parts by weight of methanol and, after mixing with a solution of about 30 parts by weight of potassium carbonate in approximately 500 parts of water, left standing about 50 hours at a temperature of about 20° C. The solution so prepared is thereafter highly concentrated in vacuo. After addition of water an amorphous powder is precipitated, which is removed by filtration with suction and dried in vacuo. Approximately 29 parts of crude product are so obtained. The material thereafter is dissolved in about 500 parts of water-free pyridine and the mixture refluxed for approximately 6 hours, after which the solution is diluted with ether, washed successively with hydrochloric acid, aqueous sodium carbonate solution and finally water, after which it is dried and evaporated. The product (about 25 parts by weight) is then preferably recrystallized from a suitable solvent such as acetone and yields colorless crystals having the empirical formula $C_{21}H_{30}O_4$ which melt at 200–205° C. with decomposition. The product is identical with the product described in my copending application Serial Number 293,505 filed September 5, 1939, now Patent No. 2,228,706, dated January 14, 1941. According to said application the product is isolated from extracts of the adrenal cortex. According to the present invention it can now be made by partial synthesis from radially available starting materials. As the natural product, the synthetic product can be converted into acyl or similar derivatives.

The monoacetate of the foregoing ketol can be readily obtained by acetylation of said product, preferably with pyridine and acetic anhydride at room temperature, and preferably using the pyridine solution of the hydroxy-ketone obtained as described in the foregoing example as the starting material. The $\Delta^4$-pregnene-3,20-dione-17,21-diol-21 monoacetate so obtained forms colorless flat needles when recrystallized from acetone which become compact when heated to about 130° C. and melt at 236-238° C. (corr.). Other esters, for instance, the propionate, butyrate, carbonate, succinate, etc., can be prepared by analogous reactions.

In a similar manner, allo-pregnane-3,17,21-triol-one-20, which melts at about 230° C. and yields a diacetate melting at 210° C. can be prepared from allo-pregnane-3,17,20-triol-21-al and its esters and from $\Delta^4$-pregnene-3-one-20-ol-21-al desoxycorticosterone can be obtained. By analogous reactions, $\Delta^4$-pregnene-3,20-dione-11,21-diol and $\Delta^4$-pregnene-3,20-dione-11,17,21-triol are obtained.

What I claim is:

1. A process for the manufacture of ketols of the saturated and unsaturated cyclopentanopolyhydrophenanthrene series, which comprises treating compounds of the said series, containing a side chain —CHR—CHO, wherein R is a member of the group consisting of a free and an esterified hydroxyl, with an enolising agent, the said chain being thus transformed into —COCH$_2$OH.

2. A process for the manufacture of ketols of the saturated and unsaturated cyclopentanopolyhydrophenanthrene-series as claimed in claim 1, which comprises treating the products obtained with esterifying agents.

3. A process for the manufacture of ketols of the saturated and unsaturated cyclopentanopolyhydrophenanthrene-series, which comprises treating compounds of the said series, containing in 17-position the side chain —CHOH—CHO, with a tertiary amine.

4. The process comprising treating $\Delta^4$-pregnene-17,20-diol-3-one-21-al with pyridine.

TADEUS REICHSTEIN.